(12) United States Patent
Harper

(10) Patent No.: US 11,069,358 B1
(45) Date of Patent: Jul. 20, 2021

(54) REMOTE INITIATION OF COMMANDS FOR USER DEVICES

(71) Applicant: Amazon Technologies, Inc., Seattle, WA (US)

(72) Inventor: David Thomas Harper, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/994,859

(22) Filed: May 31, 2018

(51) Int. Cl.
*G10L 15/26* (2006.01)
*G10L 15/22* (2006.01)

(52) U.S. Cl.
CPC .............. *G10L 15/26* (2013.01); *G10L 15/22* (2013.01); *G10L 2015/223* (2013.01); *G10L 2015/228* (2013.01)

(58) Field of Classification Search
CPC ....... G10L 15/265; G10L 15/26; G10L 15/22; G10L 2015/228; G10L 2015/223
See application file for complete search history.

(56) References Cited

U.S. PATENT DOCUMENTS

2018/0301147 A1* 10/2018 Kim .................... G10L 15/22
2019/0164556 A1*  5/2019 Weber ................ G10L 15/34

* cited by examiner

*Primary Examiner* — Ankur Jain
(74) *Attorney, Agent, or Firm* — Lee & Hayes, P.C.

(57) ABSTRACT

This disclosure describes, in part, techniques for improving the integration of voice-interaction experiences to mobile devices, and improving user experience when interacting with mobile devices that provide voice-interaction experiences. A remote system may detect an event that indicates that a mobile device is to perform an action. The remote system may determine the mobile device is not connected to the remote system, and send a push-notification message to prompt the mobile device to establish a network connection with the remote system. The mobile device may send device-context data to the remote system that indicates a role of a periphery device connected to the mobile device. Depending on the role of the periphery device and the action to be performed by the mobile device, the remote system may send a command to the mobile device using the open network connection to cause the mobile device to perform the action.

16 Claims, 9 Drawing Sheets

REMOTE INITIATION OF COMMANDS FOR USER DEVICES

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including desktops, tablets, entertainment systems, and portable communication devices. To provide users with the ability to interact with their devices using voice commands, the devices may communicate with speech-processing systems that utilize natural language understanding techniques to analyze users' voice commands and determine tasks to perform on behalf of the users. Due to the usefulness of interacting with computing devices using voice commands, it is desirable to extend voice-interaction experiences to additional types of computing devices. The technology and other innovation described herein provides, among other things, improved techniques for interacting with computing devices using voice commands.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
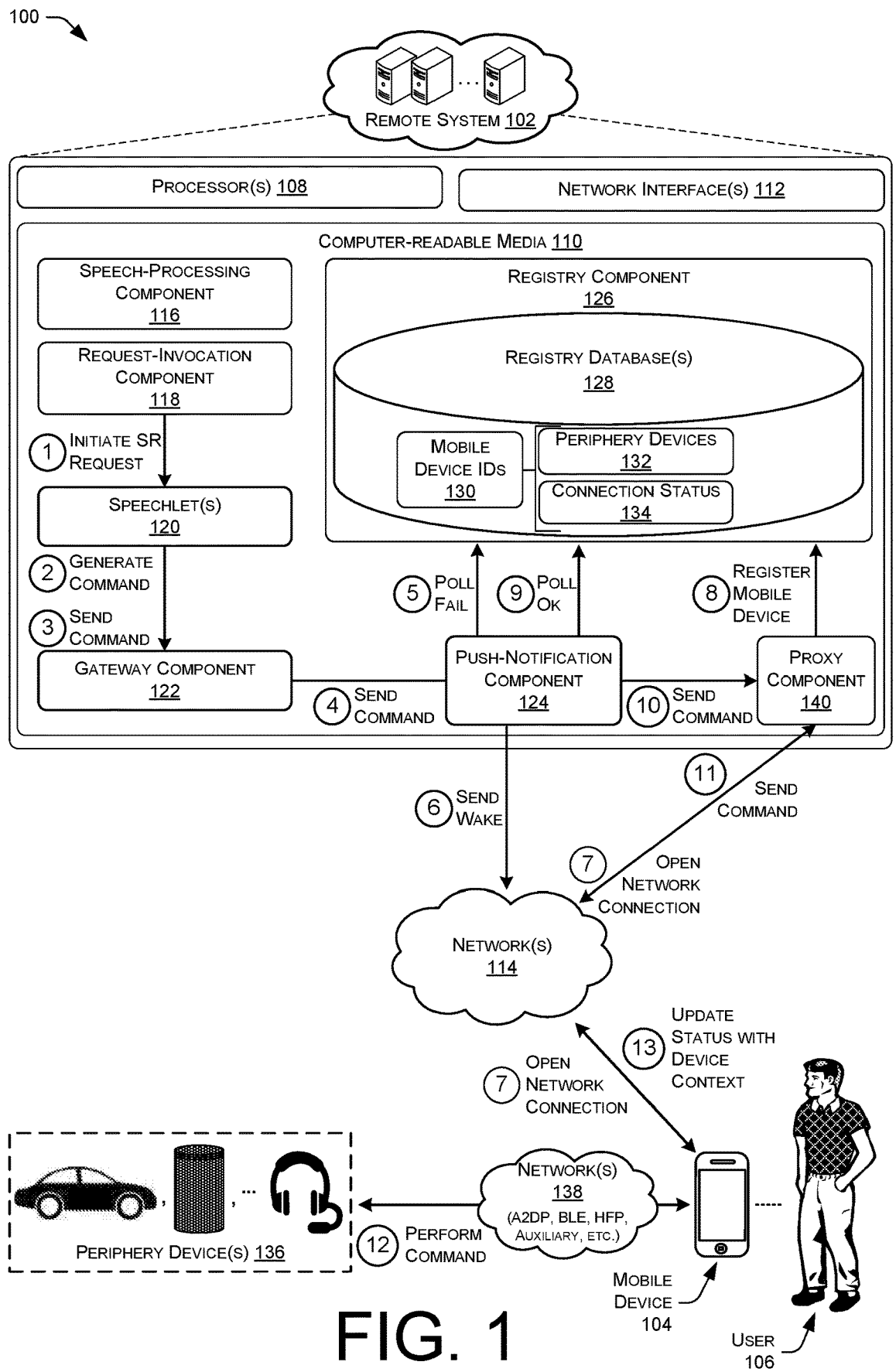
FIG. 1 illustrates a schematic diagram of an illustrative environment in which a remote system initiates the generation of a command that is to be performed at least partly by a mobile device. In this example, the remote system sends a push notification that prompts the mobile device to establish a network connection that is used by the remote system to receive device context data from the mobile device, and to send the command to the mobile device.

With the proliferation of voice-enabled computing devices, or "voice-enabled devices," users are able to interact with more of their computing devices through speech. For instance, a user may issue a command via speech to a voice-enabled device to perform an operation, such as turning on/off an appliance, streaming music, performing a telephone call, etc. To enable devices to interact with users using voice commands, various speech-processing techniques may be utilized to identify the words spoken by a user, and to identify an intent of the user expressed in the words. Due to the processing requirements for performing speech-processing techniques, voice-enabled devices may be supported by speech-processing systems that process voice commands on behalf of the voice-enabled devices. For instance, the voice-enabled devices may include one or more microphones to detect a voice command from a user and generate audio data representing the voice command. Rather than processing the audio data, the voice-enabled devices may send the audio data over a network to a remote speech-processing system, or "remote system," that performs speech-processing techniques on the audio data. The remote system may perform speech-processing techniques such as automatic speech recognition (ASR) on the audio data to generate text data representing words of the voice command, and natural language understanding (NLU) to derive intent or meaning from the text data containing the natural language command. Using the intent and/or meaning of the voice command, the remote systems may identify a task that the user is requesting to be performed, and may perform the task for the user and/or send a command to a voice-enabled device to perform at least a portion of the task.

Thus, voice-enabled devices may receive voice commands from users and communicate over a network, such as the Internet, with remote systems that process the voice commands to determine how to respond to the voice commands. In some examples, voice-enabled devices may be positioned and/or utilized in locations where network connectively is readily available, such as in homes or offices where wireless networks provide a nearly always-connected experience. In such situations, voice-enabled devices may not have difficulties sending audio data representing voice commands to the remote system over a network connection in order to determine a response to a voice command. However, when integrating a voice-interaction experience into computing devices that are mobile (e.g., phones, tablets, headsets, etc.), various issues may arise with respect to establishing network connections for these mobile devices to communicate audio data to speech-processing systems. For example, due to the inherent transient nature of mobile devices, the mobile devices may move between networks and/or in-and-out of areas in which network connectivity is not available. As another example, mobile devices may have restrictions imposed on them to preserve battery life by restricting applications from continuously running on the mobile devices to, for example, maintain network connectivity. These issues, and potentially other issues, increase the difficulty of maintaining network connectivity to mobile devices in order to support the mobile devices with speech-processing techniques provided by remote systems.

This disclosure describes, among other things, techniques for improving the integration of voice-interaction experiences to mobile devices, and improving user experience when interacting with mobile devices that provide voice-interaction experiences. A remote system according to the techniques described herein may detect an event that indicates to the remote system that a mobile device of a user is to perform a command. The command may be responsive to a system-initiated request (e.g., cloud-initiated request) to have the mobile device perform the command. For example, rather than detecting a more traditional event of receiving audio data representing a voice command of a user that requests performance of a command, the remote system may determine or detect an event that is initiated at the remote system that indicates the mobile device is to perform a command. As an example, the user of the mobile device may have registered an account with an account service of the remote system, and have regularly scheduled events that prompt the remote system to send a command to the mobile device to cause the mobile device to perform a command. As an example, the user of the mobile device may schedule a "flash briefing" event where, at 9:00 AM, the remote system sends the mobile device a summary of media content, such as news, sports, world events, etc., that is of interest to the user. Thus, the remote system may detect a system-generated event, and generate a request for a command to be sent to the mobile device in a same way that the remote system would generate a command responsive to an event of processing a voice command of the user. The request may be in a same format as a traditional speech-recognizer request that is generated responsive to determining an intent of a voice command of a user, despite the request not actually being generated for responding a voice command. In another alternative, a trigger from the mobile device may be sent to the system, such as from a location sensor, or GPS signal, from which the remote system may cause an event that is initiated at the remote system that indicates the mobile device, or other devices, are to perform an additional command(s). For example, upon arriving at the house, someone may want their heater to turn on, and send a message to the phone that this action was completed.

Upon detecting an event and generating a request that corresponds to a command to be performed at least partly by the mobile device, the remote system may determine whether the mobile device has a network connection (e.g., Internet connection using HTTP or HTTP-2) with the remote system. If the mobile device is not connected to the remote system, the remote system may generate a push notification that includes a wake-up command. The push notification that includes the wake-up command may be sent using various communication protocols, such as a Voice over Internet Protocol (VoIP), Firebase, Amazon Device Messaging (ADM), Amazon Simple Notification Service (SNS), Amazon Notifications, GCM, or APNS, and/or PushKit and be configured to prompt, instruct, or otherwise "wake up" an application on the mobile device to establish the network connection with the remote system. Thus, the remote system may send a push notification to wake up the mobile device to establish a network connection in instances where the mobile device is not already connected to the remote system. The remote system may then send the command that is to be performed at least partly by the mobile device, such as playing media content included in a flash briefing. Alternately, the request may update the current device-context to the cloud, or provide diagnostic data, or perform an activity on the phone, such as verify who may be using the device at the moment using biometrics, or rotate cryptography keys, and provide that context to the cloud.

In some examples, the remote system may further utilize context data for the mobile device to determine whether or not to send the command to the mobile device. With respect to the flash briefing example, it may be undesirable for the mobile device of the user to begin outputting media content of the flash briefing command in certain circumstances. For example, the user may be in a meeting at work, or in another circumstance where they may not want their regularly scheduled flash briefing to be output by their mobile device. Thus, in some examples the remote system may further take into account context data for the mobile device of the user to determine whether to send the command to the mobile device.

In some examples, the push notification that includes the wake-up command may further include a request for device context data, such as an indication of whether the mobile device is communicatively coupled to a periphery device. Examples of periphery devices may include headsets, speakers, vehicle stereo systems, displays, multi-capability devices, home entertainment systems, and/or other devices that may perform functions on behalf of the mobile device. For example, the user of the mobile device may connect a Bluetooth headset to their mobile device to play music while they are working out. In another example, the user of the mobile device may connect their mobile phone to a vehicle stereo system in order to conduct phone calls, stream music to the vehicle speakers, etc. Upon receiving the push notification and establishing the network connection with the remote system, the mobile device may respond to the request for the device context data by sending a response to the remote system that indicates that the mobile device is connected to a periphery device. Further, the mobile device may indicate a device type of the periphery device, and may also indicate what "roles" or actions the periphery device is performing on behalf of the mobile device. Example roles for periphery devices may include behaving as a speaker and outputting audio data on behalf of the mobile device, a microphone and detecting voice commands on behalf of the mobile device, a display to output video data, a home entertainment system, an automobile, a multi-functionality device, and so forth.

The remote system may receive the device context data and determine whether to send the command based at least partly on the device context data. For example, the remote system may refrain from sending a command to cause the mobile device to output audio data, such as flash briefing commands and/or music streaming commands, text messages, or other audio data, such as video-related audio data, if the mobile device is not connected to a periphery device with a predefined role (e.g., behaving like an output audio speaker and/or input audio microphone). Alternatively, if the device context data indicates that the mobile device is communicatively coupled to a periphery device that is behaving as defined on behalf of the mobile device, the remote system may send the command to the mobile device, which may in turn cause the periphery device to output audio data based on the command, or gather more data via the microphone. In this way, the remote system may refrain from sending commands to mobile devices that cause the mobile devices to output audio data at what may be considered inopportune times, or times where the phone may not be in a location that is suitable for audible playback of audio and/or video. For example, if the customer is currently connected to their in-car device, we can presume that the customer is in an environment where audio output is suitable, as would be the case within their home. If they are walking down the street, with no periphery device connected, we may assume that this would be an inopportune time for audio to be output by a user device for that user.

In various examples, other types of data may additionally, or alternatively, be sent from the remote system to mobile devices. For example, in addition to, or alternatively, data such as a traditional notification/message (e.g., text message from a voice-assistant) may be sent to mobile devices over the network connection, application-specific push notifications (e.g., voice-assistant application) may be sent to the mobile devices, and so forth.

In some examples, at least some of the features described in this disclosure may be enabled upon explicit user authorization, or via an "opt-in." For example, various types of the data collected, and/or techniques described herein, may not be collected or performed unless a user of the service selects an option to have the service provided. In this way, users may refrain from having different types of data collected that is utilized for the techniques described herein unless the user authorizes or otherwise requests that the services be performed and the data collected.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout. Although the figures and discussion illustrate certain operational steps of the system in a particular order, the steps described may be performed in a different order (as well as certain steps removed or added) without departing from the scope and/or intent of the disclosure.

FIG. 1 illustrates a schematic diagram of an illustrative environment 100 in which a remote system 102 initiates the generation of a command that is to be performed at least partly by a mobile device 104 of a user 106. In this example, the remote system 102 may send a push notification that prompts the mobile device 104 to establish a network connection that is used by the remote system 102 to receive device context data from the mobile device 104, and to send the command to the mobile device 104.

As illustrated, the remote system 102 (e.g., "cloud-based system," "software as a service (SaaS) system," "network-accessible system," etc.) may comprise one or more network-based devices, such as clusters of managed servers stored in data centers. The remote system of network-based device(s) may provide various services to users 106, such as speech-processing services that process voice commands of the users 106 and determine actions to perform responsive to the voice commands. The remote system 102 may include one or more processors 108 that power or drive various components that are stored in the computer-readable media 110 of the remote system 102. Further, the remote system 102 may include one or more network interfaces 112 to communicate over wired and/or wireless networks. For instance, the network interface(s) 112 may include wired or wireless interfaces, such as a wireless or Wi-Fi network communications interface, an Ethernet communications interface, a cellular network communications interface, a Bluetooth communications interface, etc., for communications with the mobile devices 104 over various types of networks 114, including wide-area network, local-area networks, private networks, public networks etc. In the case of a wireless communications interfaces, such interfaces may include radio transceivers and associated control circuits and logic for implementing appropriate communication protocols. The network interface(s) 112 may include logic for communicating using any different type of network communication protocol.

The computer-readable media 110 may store various components either in a same network-based computing device (e.g., server), or across multiple network-based computing devices, to implement functionality for the remote system 102. For instance, the remote system 102 may include a speech-processing component 116 that processes audio data representing voice commands received from mobile devices 104 of users 106. As described in more detail below, the speech-processing component may detect a voice-command event when audio data representing a voice command is received from a mobile device 104 of the user 106, and process the audio data to determine an action responsive to the voice command. Thus, in some examples the speech-processing component 116 may detect voice-command events, and determine how to respond to a voice command of a user 106.

However, in some examples the remote system 102 may determine the actions and/or commands responsive to detecting system-initiated events (e.g., cloud-initiated events, network-based device initiated events, etc.) that indicate the remote system 102 is to generate a command for the mobile device 104 to perform an action. For instance, the user 106 may have previously created/registered an account with the remote system 102 to receive services from the remote system, such as speech-processing services to respond to voice commands of the user 106. The user 106 may have requested that the remote system 102 schedule and subsequently detect various system-imitated events. For instance, the user 106 may, via an application on their mobile device 104, request that the remote system 102 schedule a flash briefing for them each morning at 9:00 AM. Generally, the flash briefing may be a service provided by the remote system 102 that provides a quick overview of news and other content such as comedy, interviews, and lists. Thus, the flash briefing is scheduled to be part of the user's 106 daily routine as they get ready for work. Other types of system-initiated events may be detected at the remote system 102. For instance, the user 106 may have been streaming music data using their mobile device 104, but they may have lost network connectivity which stopped the streaming of music. In such examples, the remote system 102 may detect a system-initiated event of the mobile device 104 losing connectivity while streaming data, and determine to attempt to reestablish a network connection with the mobile device 104. However, any type of system-initiated event may be detected.

The speech-processing component 116 may include a request-invocation component 118 which may comprise a software, application-style component that has the ability to invoke commands on behalf of the user 106 without receiving audio data representing a voice command from the mobile device 104. For example, the request-invocation component 118 may detect a system-initiated event, such as a scheduled flash briefing.

At "1", the request-invocation component 118 may initiate a speech-recognizer (SR) request based on detecting the system-initiated event. The SR request may comprise a request that emulates, or is in a same format as, voice-command requests that are received from the mobile device 104 of the user 106. Stated otherwise, the SR request may represent or correspond to a voice-command request received from the mobile device 104.

At "2", the SR request is utilized by one or more speechlets 120 to generate a command to be sent to the mobile device 104 and that indicates an action the mobile device 104 is to perform. For instance, the command generated by the speechlet(s) 120 at "2" may be an instruction for the mobile device 104 to play the flash briefing. The speechlet(s) 120 may comprise specialized software, domains, a skill server, and/or devices for responding to various requests. Each of the speechlet(s) 120 may be specialized in that they are configured to respond different types of requests depending on the request. For instance, the speechlet(s) 120 may respond to requests that "belong to" and/or correspond to different domains, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. As an example, an event and corresponding SR request may correspond to a command to play a movie (movie intent), and a movie domain speechlet 120 configured to execute a movie playing command may be utilized to generate the command at "2".

At "3", the speechlet(s) 120 generates the appropriate command (e.g., directive) and sends that to a gateway component 122 that may behave as an outbound gateway for the speech-processing component 116. The gateway component 122 may determine that, because the command was generated responsive to detecting a system-initiated event, that the command may need to be routed to a push-notification component 124. Thus, at "4" the gateway component 122 may send the command from the speech-processing component 116 to the push-notification component 124.

The push-notification component 124 may comprise software/firmware that is stored in the computer-readable media 110 and be configured to determine whether the mobile device 104 needs to be "woken up" in order to perform the action in the command. The push-notification component 124 may determine whether the mobile device 104 has an open network connection, or if a network connection needs to be established.

At "5", the push-notification component 124 may poll a registry component 126 that manages one or more registry databases 128 indicating various data about mobile devices 104 of users 106. The registry database(s) 128 may store indications of mobile device identifiers 130 (e.g., serial numbers, IP addresses, etc.) representing different mobile devices 104 of users 106, and various device context data associated with the mobile device IDs 130. The device context data may include data about any periphery devices 132 associated with the mobile device IDs 130, as well as the connection status 134 for the respective mobile device IDs 130. The periphery device 132 data may include indications of what types of periphery devices 136 are connected to a mobile device 104 of a user 106, and what roles the periphery devices 136 play for the mobile device 104 (e.g., role of behaving as a speaker on behalf of the mobile device 104, role of behaving as a microphone for the mobile device 104, role of behaving as a display, role of behaving as a home entertainment system, etc.). The connection status 134 may indicate whether the mobile devices 104 have an open network connection with the remote system 102 or not. At "5", the push-notification component 124 may poll the registry component 126 to determine that, based on the mobile device ID (e.g., IP address), the mobile device 104 does not have an open network connection across the network(s) 114 with the remote system.

At "6", the push-notification component 124 may generate and send a wake message to the mobile device 104 to wake-up an application executing on the mobile device 104 to establish a network connection with the remote system 102. The push-notification component 124 may generate any type of message that prompts the application on the mobile device 104 to establish a network connection with the remote system 102. For example, the push-notification component 124 may generate, for example, an Amazon Device Messaging (ADM) Notification, an Amazon Simple Notification Service (SNS) Notification, a PushKit notification, a Voice over Internet Protocol (VoIP) push notification message to prompt the software component to wake-up and open the network connection, a FireBase or Google Cloud Messaging (GCM) push notification message to prompt the software component to wake-up and open the network connection, an Apple Push Notification service (APNs) push notification to prompt the software component to wake-up and open the network connection, and/or any other type of push notification or message that can be delivered via a persistent socket as maintained by the OS.

In addition to prompting the software application on the mobile device 104 to establish the network connection, the push-notification message may include further request data. For instance, the push-notification component 124 may include an indication of what type of service the remote system 102 would like to wake up on the mobile device 104 (e.g., wireless connection service, location service, etc.). It may provide additional data that would allow the session to resume a particular interaction session from another device, or another application on the same phone, or to connect or disconnect from a particular accessory or peripheral. Further, the push notification message may include a request for various types of device context data such as a request for data about the one or more periphery devices 136 connected to the mobile device. The mobile device 104 may be communicatively connected and/or coupled to the periphery device(s) 136 over one or more networks 138 (e.g., A2DP, BLE, HFP, Auxiliary, USB, ZigBee, WiFi, etc.). The periphery device(s) 136 may include one or more devices, such as a vehicle audio system, an audio input/output device (e.g., Bluetooth speaker), a headset (e.g., Bluetooth headset), and/or any other type of device 136 with input and/or output capabilities for interacting with the user 106. The push-notification message may request device context data for the periphery device(s) 136, such as a request that the mobile device 104 indicate whether or not a periphery device(s) 136 is connected to the mobile device, a type of the periphery device(s) 136, a role that the periphery device(s) 136 is performing on behalf of the mobile device (e.g., speaker, microphone, display screen, home-entertainment system, automobile, multi-functional device, etc.), and potentially other context data. In some examples, one periphery device 136 may be performing as a speaker, while another periphery device 136 may be performing as a microphone. Any number of periphery devices 136 may be connected to the mobile device 104.

In some examples, the push-notification component 124 may encrypt the wake message or push-notification message using a public key. For example, when the mobile device 104 registered with the remote system 102, it may have generated a private key and a public key to be used in asymmetrical encryption of messages. Additionally, or alternately, the public key could be used to secure the transport of a symmetric key, which could be used for a single or multiple data transfers from the service to the phone, for a particular data transfer session. The mobile device 104 may have stored the private key locally on the mobile device 104, and provided a public key to the remote system 102. Thus, the remote system 102 may have encrypted the contents of the push-notification message using the public key and sent the encrypted message/data to the mobile device 104 at "6". The mobile device 104 may decrypt the push-notification message and analyze its contents. Thus, the wake command included in the push-notification message may prompt an identified software component to wake up and perform one or more actions.

At "7", the software component on the mobile device 104 may open a network connection over the network(s) 114 with the remote system 102. For example, the mobile device 104 may open an Internet connection using one or more protocols, such as Hypertext Transfer Protocol (HTTP), HTTP-2, and/or any other protocol, with a proxy component 140 of the remote system 102. Once the network connection is opened between the mobile device 104 and the remote system 102, the mobile device 104 may send the device context data to the remote system 102 that was requested. For instance, the mobile device 104 may send a response message that includes the requested data, such as an indication of the periphery device(s) 136 connected to the mobile device 104, and also an indication of the role(s) being performed by the periphery device(s) 136. The mobile device 104 may also encrypt the response message prior to sending the response message to the remote system 102 over the network connection that was opened at "7".

At "8", the proxy component 140 may register the mobile device 104 with the registry component 126. For instance, the proxy component 140 may decrypt the response message and analyze its contents. The proxy component 140 may then register the mobile device 104 as having an open network connection, and also store the device context data for the mobile device IDs in the registry database(s) 128.

At "9", the push-notification component 124 may poll the registry component 126 and determine that the mobile device 104 now has an open network connection with the remote system 102 and is able to communicate over the network(s) 114 with the remote system 102. In some examples, the push-notification component 124 may continue to poll the registry component 126 periodically for a window of time until one of a time-out occurs or the push-notification component 124 determines that the network connection has been established. Upon determining that the mobile device 104 has the open network connection, at "10" the push-notification component 124 may send the command to the proxy component 140 to communicate on behalf of the remote system 102.

Depending on the type of command, the proxy component 140 may determine whether or not to send the command at "11" to the mobile device 104. For example, if the command includes an instruction to output audio data, such as playing a flash briefing, streaming music or a movie, etc., then the proxy component 140 may determine, based on the registry database(s) 128, whether the mobile device 104 has a periphery device 136 connected to it that is behaving as a speaker, display screen, entertainment system, and/or microphone. For example, the proxy component 140 may utilize the mobile device ID 130 of the mobile device 104 and determine if the associated periphery device data 132 indicates that a periphery device 136 has a role of a speaker. If the mobile device 104 has a periphery device 136 behaving as a speaker and/or microphone, then the proxy component 140 may determine to send the command that instructs the mobile device 104 to send audio data to the periphery device 136 to be output. Alternatively, if the mobile device 104 does not have a periphery device 136 behaving as a speaker and/or microphone on behalf of the mobile device 104, then the proxy component 140 may refrain from sending the command at "11". Alternately, the system may additionally determine that if a specific device that is categorized to have the capability to serve as wakeword engine is not present, the system may wish to further change its behavior. In this way, commands that include outputting audio data may be sent to the mobile device 104 if the mobile device 104 is connected to a periphery device 136. In this way, the user experience for the user 106 may be improved by refraining from causing audio data to be output by the mobile device 104 at inopportune times, and cause audio data to be output by a periphery device 136 at times when the user 106 would like to have audio data output. However, in other examples, the command may be sent at "11" despite the mobile device 104 not having a periphery device 136 connected, and the audio data may simply be output by the mobile device 104.

At "11", the proxy component 140 may send the command over the network connection (e.g., HTTP, HTTP-2, etc.) via the network(s) 114 to the mobile device. In some examples, the command may also be encrypted, and may include an instruction that the mobile device 104 is to perform an action. For instance, the command sent at "11" may instruct the mobile device 104 to stream/send audio data across the network(s) 138 to be output by the periphery device(s) 136.

At "12," the mobile device 104 may decrypt the command and determine the action that the mobile device 104 is to perform. In some examples, the action may include sending audio data to the periphery device 136. For instance, the command may instruct the mobile device 104 to have a periphery device 136 that has a role of a speaker to output audio data, such as streaming music, performing a telephone call, playing a flash briefing, news broadcast, etc. However, a command to perform any type of action may be received at the mobile device 104, and may be performed entirely by the mobile device 104, entirely by the periphery device(s) 136, and/or performed by a combination of each of the devices.

At "13", the mobile device 104 may update the remote system 102 with of the status of the mobile device along with device context. For instance, as the mobile device 104 is streaming audio data, the user 106 may disconnect the periphery device 136, and the mobile device 104 may send device context data indicating that the periphery device 136 is no longer connected.

In various examples, the mobile device 104 may send device context data at "13" periodically to provide the remote system 102 with information to more intelligently perform the operations described herein. For instance, the mobile device 104 may provide indications of when the user 106 typically has periphery devices 136 connected to the mobile device 104 so that the remote system 102 may determine more appropriate times to send commands to the mobile device 104 that may utilize a periphery device 136. Further, the mobile device 104 may provide indications of the topologies of the connections between the mobile device 104 and one or more of the periphery devices 136. For instance, particular topologies may not be as suitable for performing certain commands. In some examples, an application executing on the mobile device 104 may prompt the user 106 to provide input as to whether a command should be performed, and which device is to perform the command.

For example, once the command is sent at "11", the mobile device 104 may determine that the command is an instruction that the mobile device 104 play flash briefing audio data. The application may present a visual notification on the display of the mobile device 104, and/or output an audio prompt, requesting the user 106 provide input as to whether the user 106 would like to output the flash briefing or news audio data on the mobile device 104 microphone, utilize a periphery device 136, or not output the flash briefing, news, or other streaming content.

Figure 2:
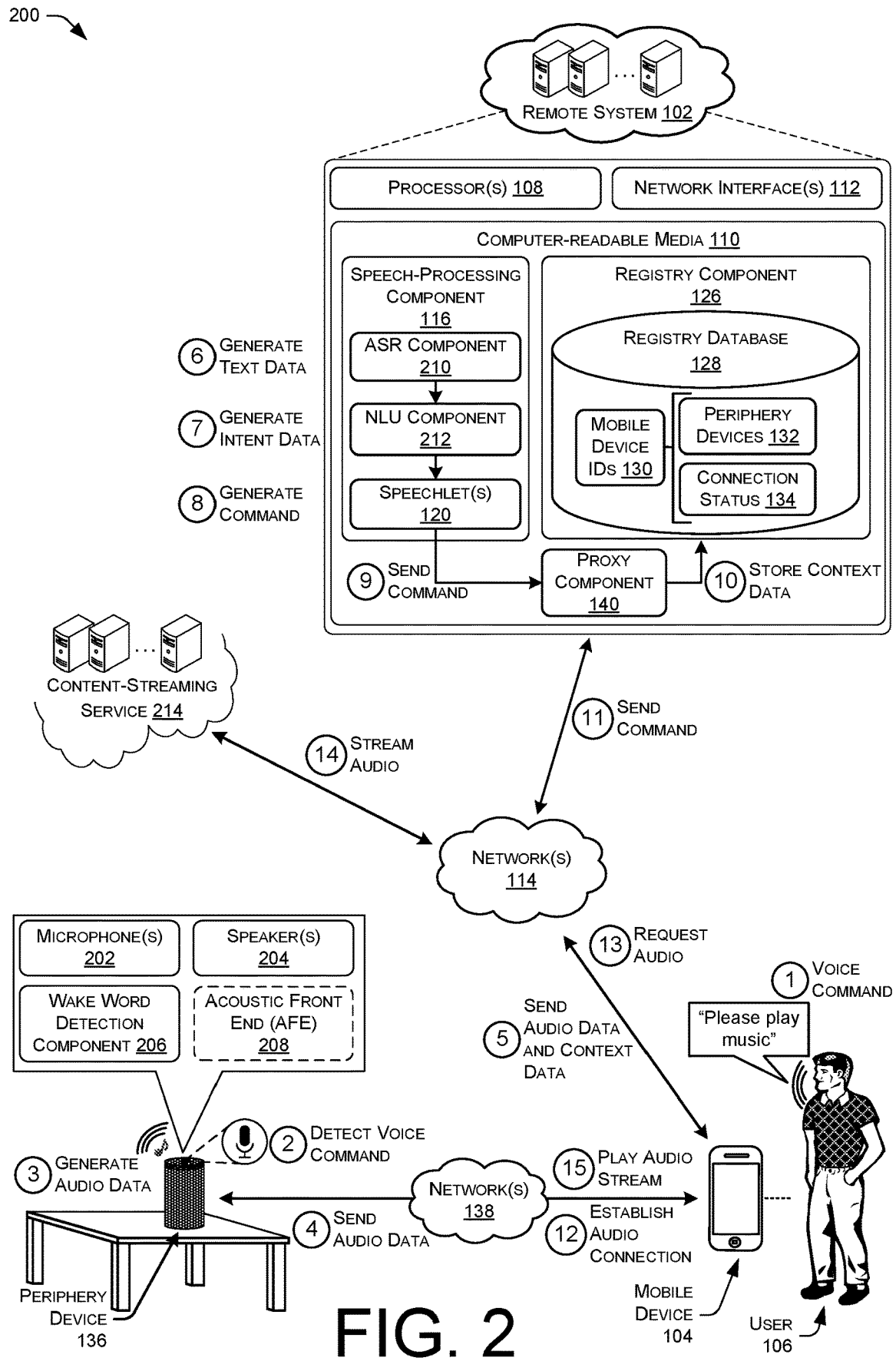
FIG. 2 illustrates a schematic diagram of an illustrative environment in which a remote system collects device context data for a periphery device that is communicatively connected to a mobile device of a user.

FIG. 2 illustrates a schematic diagram of an illustrative environment 200 in which a remote system 102 collects device context data for a periphery device 136 that is communicatively connected to a mobile device 104 of a user 106.

In the illustrated example, the mobile device 104 may be communicatively coupled/connected to a periphery device 136 over a network(s) 128. In the illustrated example, the network(s) 128 may comprise a wireless network over which the devices 104 and 136 communicate using various protocols (e.g., Bluetooth Low Energy (BLE) profile, Bluetooth Advanced Audio Distribution profile (A2DP), WiFi, ZigBee, etc.). However, the network(s) 128 may comprise wired connections (e.g., auxiliary, USB, etc.), and/or any combination of wired and/or wireless connections. In the illustrated environment 200, the mobile device 104 may work in conjunction with the periphery device 136 to extend a voice-interaction experience to the user 106. For example, the mobile device 104 may be configured to communicate over network(s) 114 with various remote systems and/or services, and the periphery device may be configured to perform various roles on behalf of the mobile device 104, such as a speaker, display screen, entertainment system, automobile, appliance, and/or a microphone.

At "1" in the illustrated example, the user 106 may speak a voice command of "Please play music" into the environment 200. The user 106 may have an account with the remote system 102 and utilize a speech-processing service provided by the remote system 102 to respond to his/her voice commands. Each of the user's 106 devices, mobile device 104 and periphery device 136, may be registered with the account of the remote system 102 for the user, and further be configured with software and/or hardware components to provide the voice-interaction experience for the user 106. In the illustrated example, the mobile device 104 may comprise a phone, tablet, or other personal device of the user 106, and the periphery device 136 is illustrated as an audio input/output device usable to interact with the user 106 106 via speech.

At "2", the periphery device 136 may detect the voice command, or initiatory phrase, of the user 106. For example, the periphery device may include one or more microphones 202 that are used to capture user speech, such as the voice command, and one or more speakers 204 that are used to play speech (e.g., dialogue) and content (e.g., music, videos, flash briefing, etc.). In some embodiments, the periphery device 136 may be designed to operate from a fixed location, and in other embodiments, the periphery device 136 may be portable or mobile. For instance, the periphery device 136 may comprise handheld devices or other mobile devices, such as smartphones, tablet computers, media players, personal computers, wearable devices, various types of accessories, and so forth.

In some examples, the periphery device 136 may simply "listen" for speech from a user, and use various techniques (e.g., voice-activity detection) to determine that a user 106 is speaking as opposed to detecting background noise in the environment 200. However, in some examples the periphery device 136 may include a wake word detection component 206 that is configured to detect a predefined initiatory phrase, or trigger expression or wakeword (e.g., "awake", "Alexa", etc.), which may be followed by instructions or directives (e.g., "please end my phone call," "please turn off the alarm," etc.). Services provided by the periphery device 136, mobile device 104, and/or the remote system 102 may include performing actions or activities, rendering media, obtaining, and/or providing information, providing information via generated or synthesized speech via the periphery device 136, initiating Internet-based services on behalf of the user 106, and so forth.

In this example, at "2" the periphery device 136 may receive or capture sound corresponding to the voice command of the user 106 via the microphone(s) 202. In certain implementations, the voice command may include or be preceded by the wake word or other trigger expression or event that is spoken by the user 106 to indicate that subsequent user speech is intended to be received and acted upon by the periphery device 136 and/or remote system 102. The wake word may be a reserved keyword that is detected locally by the periphery device 136, such as by using an expression detector that analyzes audio signals produced by the microphone(s) 202 of the periphery device 136 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

At "3", the periphery device 136 may generate audio data subsequent to detecting the wakeword. The periphery device 136 may optionally include an acoustic front end (AFE) 208 for generating the audio data using the microphone(s) 202, and performing some acoustic pre-processing techniques on the audio data. The AFE 208 may include functionality for processing microphone audio signals generated by the microphone(s) 202 and/or output audio signals provided to the speakers 204. As an example, the AFE 208 may include an acoustic echo cancellation or suppression component for reducing acoustic echo generated by acoustic coupling between the microphone(s) 202 and the speaker(s) 204. The AFE 208 may also include a noise reduction component for reducing noise in received audio signals, such as elements of microphone audio signals other than user speech. The AFE 208 may include one or more audio beamformers or beamforming components configured to generate directional audio signals that are focused in different directions. More specifically, the beamforming components may be responsive to audio signals from spatially separated microphone elements of the microphone(s) 202 to produce directional audio signals that emphasize sounds originating from different areas of the environment of the periphery device 136 or from different directions relative to the periphery device 136. The AFE 208 may also include a voice activity detection component configured to monitor levels of voice presence in the directional audio signals produced by the beamforming component.

At "4", the periphery device 136 may begin sending/streaming the audio data to the mobile device 104. In some instances, the periphery device 136 may operate in a low-functionality mode and analyze sound using ASR processing. When the wakeword is detected using ASR, the periphery device 136 may begin sending/streaming the audio data to the remote system 102 directly, or via the mobile device 104.

At "5", the mobile device 104 may initiate communication with the remote system 102 to process the voice command by sending or streaming the audio data and context data to the remote system 102 over the network(s) 114. The context data may indicate various device-context data for the mobile device 104 and the connected periphery device 136. For instance, the mobile device may determine information about the periphery device 136 (e.g., serial type of device, device capabilities, etc.), and may further determine what roles the periphery device 136 is performing on behalf of the mobile device 106. For example, the periphery device 136 may include higher quality components as compared to the mobile device 106, such as higher quality microphone(s) 202, higher quality speakers(s) 204, etc. Further, the periphery device 136 may be positioned in a better location to interact with the user 106 via speech. The user 106 may prefer to talk to the periphery device 136 on a table, and have the periphery device 136 respond to the user 106, as opposed to communicating with the mobile device 104 that may be located in a pocket of the user 106. Thus, the mobile device 104 may determine context data that indicates the roles of the periphery device 136 is to operate as a microphone on behalf of the mobile device 104 to capture sound in lieu of the mobile device 104, and also to operate as a speaker on behalf of the mobile device 104 and output sound in lieu of the mobile device 104 outputting sound. Thus, at "5" the mobile device 104 may send the audio data and also context data (potentially at different times and/or in different messages).

Upon receiving the audio data and context data, the remote system may begin processing the audio data (or audio signals) generated by the periphery device 136 and received from the mobile device 104 in order to formulate responses to the user 106. The remote system 102 may be implemented as one or more computing devices including one or more servers, desktop computers, laptop computers, or the like. In one example, the remote system 102 is configured in a server cluster, server farm, data center, mainframe, cloud computing environment, or a combination thereof. To illustrate, the remote system 102 may include any number of devices that operate as a distributed computing resource (e.g., cloud computing, hosted computing, etc.) that provides services, such as storage, computing, networking, and so on. For example, the speech-processing component 116 of the remote system 102 may include an automatic speech recognition (ASR) component 210 to determine text of the voice command represented in the audio data, a natural language understanding (NLU) component 212 to determine an intent and/or an event based on the text data, and the speechlet(s) 120 to generate a command based on the intent/event data.

At "6", the ASR component 210 may process the audio data to generate text data that corresponds to words of the user 106 expressed in the voice command. The ASR component 210 may detect the voice command endpoint and send a message to the mobile device 104 to close the stream of the audio data. Further, the ASR component 210 may process the audio data to determine textual data which corresponds to the voice command. Generally, the ASR component 210 may convert the audio data into text. The ASR component 210 transcribes audio data into text data representing the words of the speech contained in the audio data. The audio data representing the voice command may be input to a processor configured to perform ASR which then interprets the utterance based on the similarity between the utterance and pre-established ASR language models stored in an ASR model knowledge base. For example, the ASR component 210 may process the audio data by comparing the input audio data with models for sounds (e.g., subword units or phonemes) and sequences of sounds to identify words that match the sequence of sounds spoken in the utterance of the audio data.

At "7", the NLU component 212 may receive the text data representing words of the voice command and generate intent data that indicates a likely intent of the user 106 who issued the voice command. Generally, the NLU component 212 takes textual input (such as the textual input determined by the ASR component 210) and attempts to make a semantic interpretation of the text. That is, the NLU component 212 determines the meaning behind the text based on the individual words and then implements that meaning. NLU component 212 interprets a text string to derive an intent or a desired action from the user 106 as well as the pertinent pieces of information in the text that allow a device (e.g., mobile device 104, periphery device 136, etc.) to complete that action. For example, if a voice command is processed using ASR component 210 and outputs the text "play music" the NLU component 212 may determine that the user 106 intended that the mobile device 104 cause the periphery device 136 to be instructed to play music. In this example, the NLU component 212 determines that the intent of the user 106 is to play music on one of their devices 104/136.

To correctly perform NLU processing of speech input, the NLU component 212 may be configured to determine a "domain" of the utterance so as to determine and narrow down which services offered by the endpoint device (e.g., remote system 102 and/or mobile device 104) may be relevant. For example, an endpoint device may offer services relating to interactions with a telephone service, a contact list service, a calendar/scheduling service, a music player service, etc. The NLU component 212 receives a query in the form of ASR results and attempts to identify relevant grammars and lexical information that may be used to construe meaning. To do so, the NLU component 212 may begin by identifying potential domains that may relate to the received query. The NLU component 212 may determine that a music domain is appropriate for the intent, and route the intent to the appropriate speechlet(s) 120 for the music domain.

At "8", the speechlet(s) 120 may generate a command based on the intent received from the NLU component 212. The speechlet(s) 120 may each be associated with a different domain. For instance, each of the speechlet(s) 120 may be associated with a domain which has been trained or biased to determine commands based on intents. As an example, a speechlet(s) 120 may be associated with an NLU model that has been trained or biased to determine commands that are associated with a music domain, as opposed to a movie domain or a shopping domain. In this example, the speechlet(s) 120 may generate a command that causes the mobile device 104 to output audio data, or in some examples, causes the mobile device 104 to cause the periphery device 136 to output audio data (e.g., music).

At "9", the speechlet(s) 120 may send the command to the proxy component 140. At "10", the proxy component 140 may store the context data that was received from the mobile device 104 in the registry database(s) 128. For example, the proxy component 140 may store an indication of the connection stats 134 of the mobile device 104, as well as the device-context data for the periphery device 136 of the mobile device 104.

At "11", the proxy component 140 may send the command to the mobile device 104. The command may instruct the mobile device 104 to perform one or more actions, such as to play the requested music or video content. For example, the command may cause the mobile device 104 to, at "12", establish an audio connection with the periphery device 136 (e.g., A2DP), and at "13", request the audio data from a content-streaming service 214. In some examples, the command may provide the mobile device 104 with a location (e.g., Uniform Resource Locator (URL)) associated with the content-streaming service 214. The content-streaming service (e.g., Pandora, Spotify, etc.) may then streaming the requested audio data to the mobile device 104. At "15", the mobile device 104 in turn streams the audio data form the content-streaming service 214 to the periphery device 136. The mobile device 104 may include an application that determines that the periphery device 136 is serving as the speaker and/or microphone for the mobile device 104, and that audio data is to be output by the periphery device 136 on behalf of the mobile device 104.

Thus, as shown above, device-context data for the periphery device 136 and/or mobile device 104 may be obtained by the remote system 102 while responding to a voice command of a user 106. In this way, when the remote system 102 later attempts to initiate a network-based event and command, the remote system 102 may have stored the periphery device data 132 in the registry database(s) 128 for the mobile device 104, and may also have stored the connection status 134 of the mobile device 104. Thus, FIG. 2 illustrates an example process for obtaining device-context data.

In some examples, the remote system 102 may be able to analyze device-context data overtime to make more intelligent decisions as to when to initiate certain network-based events. For example, if the remote system 102 determines that the user 106 has their mobile device 104 communicatively connected to a periphery device 136 that has a role of a speaker for the mobile device 104 at certain times of the day, the remote system 102 may determine that those specific times would be appropriate times at which to initiate and generate a command for the mobile device 104 to, for example, output audio data using the periphery device 136. Thus, the remote system 102 may utilize this process of collecting device-context data when the user 106 issues a voice command to determine times at which network-initiated commands may be sent to the mobile device 104.

Figure 3A:
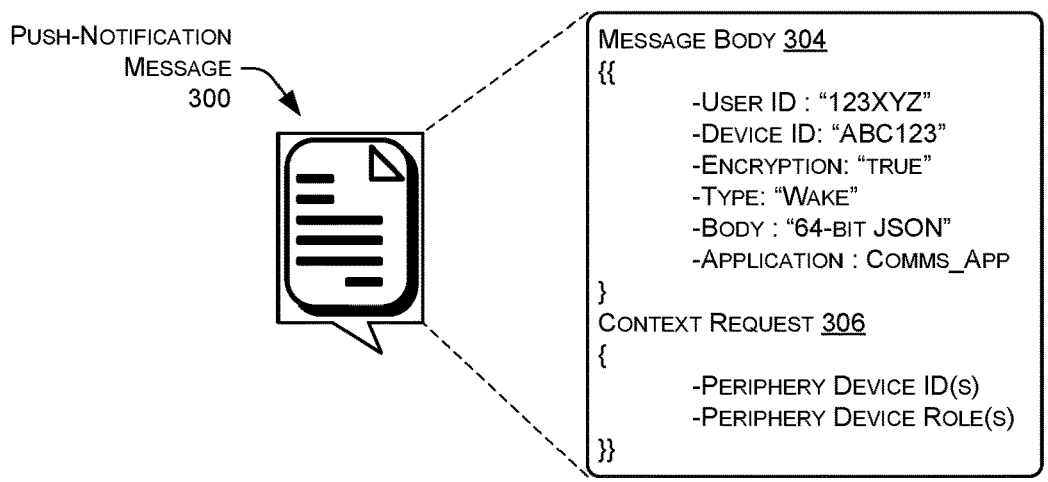
FIG. 3A illustrates an example push-notification message that is sent from a remote system to a mobile device of a user.

FIG. 3A illustrates an example push-notification message 300 that is sent from a remote system (e.g., remote system 102) to a mobile device (e.g., mobile device 104) of a user.

The illustrated push-notification message 300 depicts data that may be included in a push-notification message 300 utilized according to the techniques described herein. However, different data and/or formatting may be utilized for the push-notification message 300. The push-notification message 300 may be generated and/or formatted according to different communication protocols, such as VoIP, GCM, APNs, XMPP, or other source with a consistent network connection as provided by the OS.

Generally, the push-notification message 300 may be sent to the mobile device 104 of a user 106 in order to prompt an application or other component on the mobile device 104 to perform an action. As illustrated, the push-notification message 300 may include a message body 304 which includes various data, such as a user ID indicating a user account for the user 106 that the mobile device 104 is registered to, and a device ID indicating the mobile device 104 (e.g., serial number, IP address, etc.). Further, the message body 304 may indicate that the message is encrypted and requires the use of a key to decrypt, and may further indicating a type of the push-notification message 300. In this example, the type of the push-notification message 300 is a wake message, indicating that the push-notification message 300 is intended to wake a component or application on the mobile device 104. The message body 304 includes the actual body of the message, which may comprise a base-64 encoded JSON string that is encrypted using a key. Finally, the push-notification message 300 indicates what application is to wake up and perform a command.

Further, the push-notification message 300 may include a context request 306 which indicates context data that the remote system 102 is requesting from the mobile device 104. In this example, the push-notification message 300 includes a context request 306 for periphery device ID(s) to identify what, if any, periphery or on phone hardware devices 136 are communicatively connected to the mobile device 104. The periphery device ID may include a name of the device, a device type, a serial number, or any other data required by the remote system 102. Additionally, the context request 306 may include a request for periphery device roles of any periphery devices 136 connected to the mobile device 104. Roles may include, but are not limited to, behaving as a speaker on behalf of the mobile device 104, behaving as a microphone on behalf of the mobile device 104 (e.g., voice command detection), behaving as a display screen, behaving according to automobile functions, behaving according to multi-functionality devices (e.g., includes two or more of a microphone, speaker, display, etc.), behaving as an appliance on behalf of the mobile device 104, and so forth. Generally, the mobile device 104 may be connected to any type of periphery devices, and the periphery devices may have any number and/or type of roles based on functionality of those periphery devices.

In this example, the mobile device 104 may receive the push-notification message 300, decrypt its encrypted contents, and determine an action to perform. This push-notification message 300 includes a wake command that causes a communications application to "wake up" on the mobile device 104, and perform the requested action. In this example, the push-notification message 300 may prompt the communications application on the mobile device 104 to establish a network connection (e.g., HTTP, HTTP-2, etc.) between the mobile device 104 and the remote system 102. Further, once the network connection is established, the mobile device 104 may provide the device-context or user-context data that was requested in the context request 306 of the push-notification message 300. Thus, the push-notification message 300 may cause the mobile device 104 to establish a network connection with the remote system 102, and may further request context data from the mobile device 104 regarding periphery devices 136 communicatively connected to the mobile device 104.

Figure 3B:
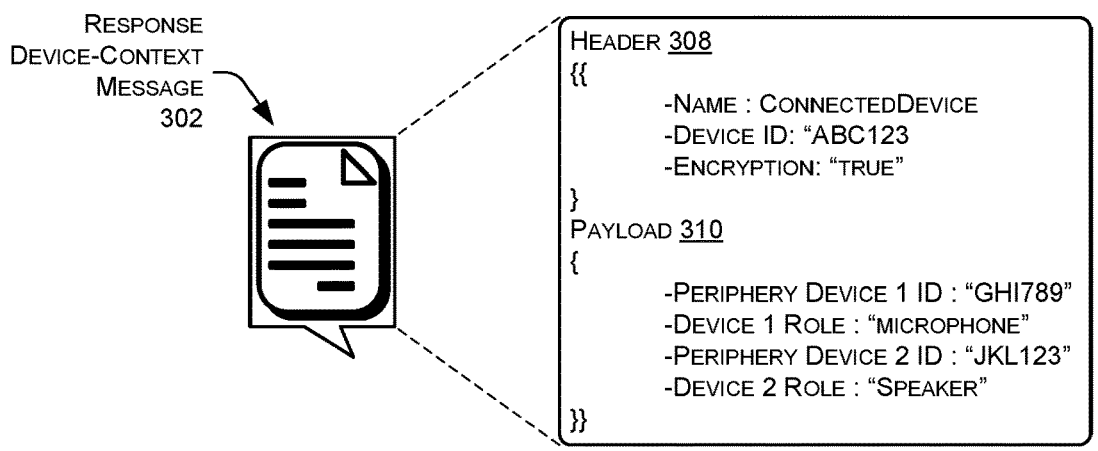
FIG. 3B illustrates an example response device-context message that is sent from a mobile device of a user to a remote system to provide context data about a periphery device communicatively connected to the mobile device.

FIG. 3B illustrates an example response device-context message 302 that is sent from a mobile device (e.g., mobile device 104) of a user to a remote system (e.g., remote system 102) to provide context data about a periphery device 136 communicatively connected to the mobile device.

At illustrated, the response device-context message 302 may include a header 308 which indicates the name of the mobile device 104, the device ID for the mobile device (e.g., IP address, serial number, etc.), and an indication that the message is encrypted and requires a key to be decrypted. The response device-context message 302 may further include a payload 310, which may be encrypted using a key. The payload 310 may indicate information, or device-context data, for periphery devices 136 connected to the mobile device 104. For instance, the payload 310 may indicate periphery device IDs for two periphery devices 136 connected to the mobile device 104. Further, the payload 310 may indicate device roles for each of the periphery devices 136 connected to the mobile device 104. In this example, one of the periphery devices 136 has a role of microphone for the mobile device 104, while another periphery device 136 has a role of speaker for the mobile device 104. However, a single periphery device and role, or any number of periphery device indications and roles may be indicated in the response device-context message 302.

Upon receiving the response device-context message 302, the remote system 102 may store the device-context data in a registry database, as explained in more detail in FIG. 4 below.

Figure 4:
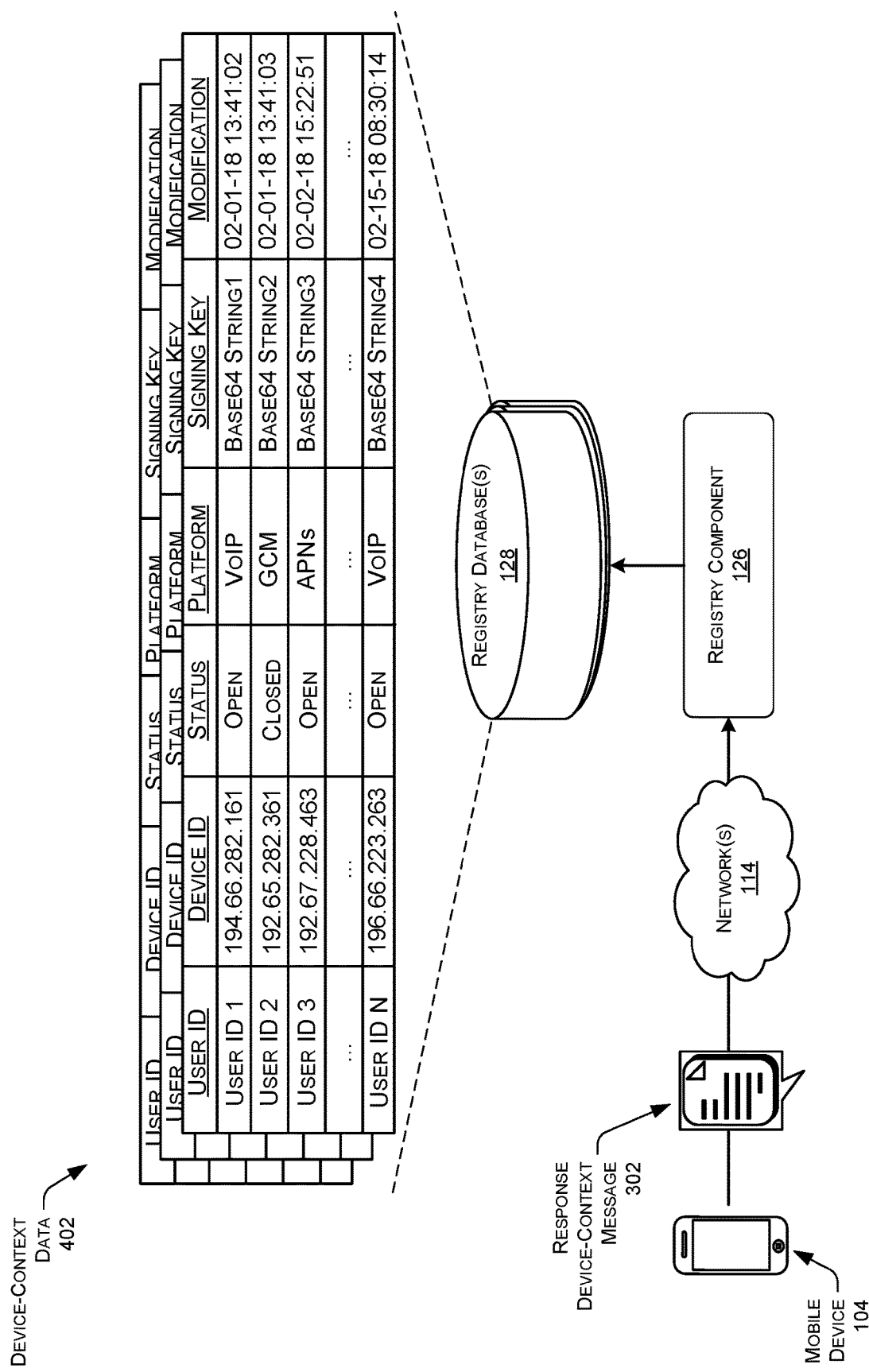
FIG. 4 illustrates an example registry database of a remote system that stores device-context data for mobile devices associated with the remote system.

FIG. 4 illustrates an example registry database(s) 128 of a remote system 102 that stores device-context data for mobile devices 104 associated with the remote system 102. In some examples, the registry database(s) 128 may comprise a single database 128 located on device of the remote system 102, and in other examples, the registry database(s) 128 may comprise a plurality of database(s) located on various devices of the remote system 102 at the same or different geographic locations.

As illustrated, a mobile device 104 may send a response device-context message 302 over network(s) 114 to the remote system 102. A registry component 126 that is tasked with managing a registry database(s) 128 may receive device-context data included in the response device-context message 302 and store it in the registry database(s) 128.

In some examples, the registry component 126 may store, and continuously update, device-context data 402 in the registry database(s) 128. Although illustrated as a table type data structure, the device-context data 402 may be stored in the registry database(s) 128 in different arrangements and/or formats. The device-context data 402 may include different types of data, such as indications of user IDs for users 106 with accounts registered with the remote system 102, and device IDs for mobile devices 104 (and other devices) that are registered with the different user ID/accounts. Further, the device-context data 402 may indicate a network-connection status of the different devices as being "open" or "closed". For instance, when a mobile device 104 establishes a network connection, the status may be updated to "open", and when a mobile device 104 drops a network connection, the status may be updated to "closed". The device context data 402 may all be stored in a single registry database 128, or split among any number of databases 128.

Further, the device-context data 402 may indicate different platforms that may be used when communicating with the different mobile devices 104. The platforms may indicate which communication protocol may be used when communicating a push-notification message 300 to the corresponding mobile device 104. The device-context data 402 may further include an indication of a signing key that is utilized to sign and/or encrypt data in push-notification messages 300, and/or decrypt data included a response device-context message. The signing key may comprise a Base64 string which represents a public key for encrypting the push message. The device-context data 402 may also include indications of a last time the respective entries have been modified. The status of the device-context data 402 may further include an IP address of the mobile devices 104 for use in communicating with the mobile devices 104. However, additional data, or less data, may be included in the device-context data 402 of the registry database(s) 128.

Figure 5:
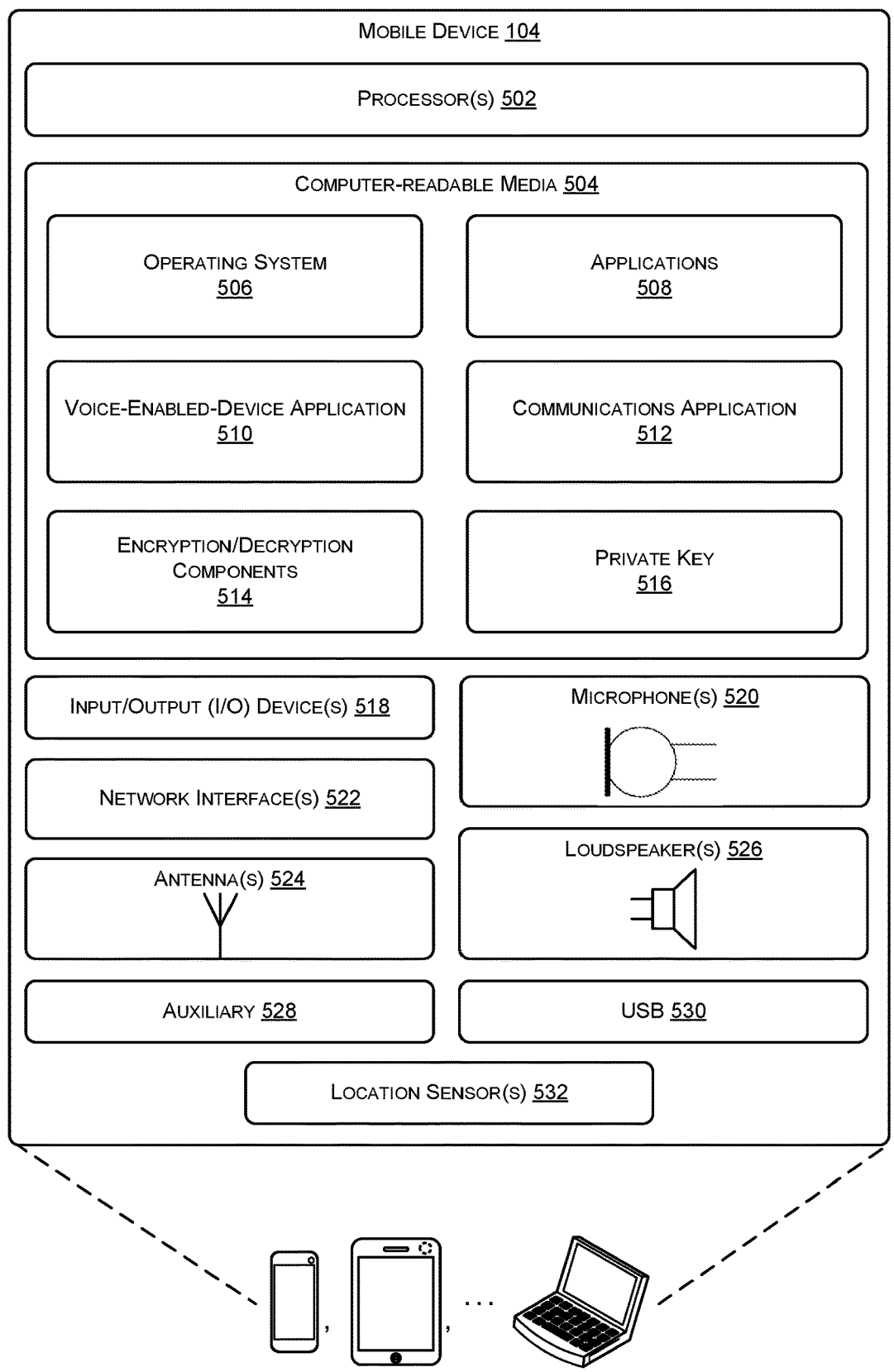
FIG. 5 illustrates a component diagram of an example mobile device according to techniques of this disclosure.

FIG. 5 illustrates a component diagram of an example mobile device 104 according to techniques of this disclosure. However, other components may be included in the mobile device 104, and/or certain components may not be included in the mobile device 104, depending on the configuration of the device 104 and periphery devices 136.

In some examples, the mobile device may comprise any type of mobile device, such as a phone, a tablet, a laptop, a watch, glasses, wearable device, or any other type of mobile device 104. The mobile device 104 may be carried with a user 106, or fixed in a mobile location such as an interior of a vehicle. For instance, the mobile device 104 may be fixed to, or part of, a vehicle head unit.

In the illustrated implementation, the mobile device 104 includes one or more processors 502 and computer-readable media 504. The one or more processors 502 may process data and power the various hardware, software, and firmware components of the mobile device 104. The computer-readable media 504 may store various components, including an operating system 506 that is configured to manage hardware and services within and coupled to the mobile device 104 for the benefit of other modules. In addition, the computer-readable media 504 may store one or more applications 508 that a user 106 may interact with by issuing voice commands to the mobile device 104 and/or the periphery device 136, such as a music player, a movie player, a timer, a calendar, and a personal shopper. However, the mobile device 104 may include any number or type of applications and is not limited to the specific examples shown here. The music player may be configured to play and/or stream songs or other audio files. The movie player may be configured to play and/or stream movies or other audio visual media. The timer may be configured to provide the functions of a simple timing device and clock. The personal shopper may be configured to assist a user 106 in purchasing items from web-based merchants.

The computer-readable media 504 may store a voice-enabled-device application 510 which includes functionality for extending the voice-interaction experience to the mobile device 104. The voice-enabled-device application 510 may include instructions for performing some or all of the operations described herein as being performed by the mobile device 104. For instance, the voice-enabled-device application 510 may be configured to interpret commands from the remote system 102 and perform appropriate actions. Further, the voice-enabled-device application 510 may include instructions for interacting with the periphery devices 136 to utilize the periphery devices 136 as different roles on behalf of the mobile device 104. For example, the voice-enabled-device application 510 may determine that a periphery device 136 is able to perform as a speaker, and send audio data to be output by the periphery device 136 when it performs as a speaker. Further, the voice-enabled-device application 510 may determine that a periphery device 136 is to perform as a microphone, and receive audio data over a connection from the periphery device 136 that was generated by a microphone of the periphery device 136. The voice-enabled-device application 510 may perform other functions as well for extending the voice-interaction experience to the mobile device 104 and/or the periphery devices 136. As a specific example, the voice-enabled-device application 510 may identify a command to stream music that is received from the remote system 102. The voice-enabled-device application 510 may request the music from an online source (e.g., content-streaming service 214), and receive an audio stream from the source. The voice-enabled-device application 510 may then route the audio data to the periphery device 136 that is behaving as a speaker. However, the voice-enabled-device application 510 may be configured to perform at least part of any command received from the remote system 102.

The computer-readable media 504 may further include a communications application 512 to communicate via various protocols. The communications application 512 may be configured to communicate using any communication protocol, such as VoIP, GCM, APNs, HTTP, HTTP-2, XMPP, FireBase, and so forth. The communications application 512 may also be prompted by a push-notification message 300 to "wake up" and establish a network connection with the remote system 102. In some examples, the communications application 512 may be configured to communicate with a periphery device 136 over a BLE network to receive various audio data, such as audio data representing voice commands detected by the periphery device 136. The communications application 512 may include logic, such as protocols, for communication over any type of network (e.g., PANs, WANs, LANs, etc.), and using various protocols or standards (Bluetooth, WiFi, ZigBee, etc.). Alternately, the voice commands could be provided via a DSP, FPGA, or SOC wakeword and audio processing implementation. The data would then be directly routed into the system from that microphone source instead of via network protocol.

The computer-readable media 504 may include an encryption/decryption component 514 that utilizes a private key 516 to encrypt and decrypt data. Alternately, it could use a symmetric key that is exchanged via the public/private key cryptography. For instance, when the mobile device 104 is registered with the remote system 102, the encryption/decryption component 514 may generate a public key and provide the public key to the remote system 102, and also generate the private key 516 and store it locally for use in encrypting/decrypting. The encryption/decryption component 514 may utilize the private key 516 to, for example, decrypt at least a portion of the push-notification message 300, encrypt at least a portion of the response device-content message 302, etc.

As shown in FIG. 5, the mobile device 104 may further include various hardware components. The mobile device 104 may include or be associated with various input/output devices 518, such as displays, keyboards, navigation buttons, touch screens, LEDs, a mouse, haptic sensors, joysticks, and so forth, for receiving input from a user 106, and also for outputting information or data to a user 106. Additionally, the mobile device 104 may include one or more microphones 520 which may include sensors (e.g., transducers) configured to receive sound. The microphones 520 generate input signals for audio input (e.g., sound). For example, the microphones 520 may determine digital input signals for an utterance of the user 106 in examples where the mobile device 104 behaves as a microphone.

The mobile device 104 may have one or more network interfaces 522 such as a wireless or Wi-Fi network communications interface, an Ethernet communications interface, a cellular network communications interface, a Bluetooth communications interface, etc., for communications with the periphery device 136 and/or the remote system 102 over various types of networks, including wide-area network, local-area networks, private networks, public networks etc. In the case of a wireless communications interfaces, such interfaces may include radio transceivers and associated control circuits and logic for implementing appropriate communication protocols. The network interfaces 522 may utilize one or more antennas 524 of the mobile device 104 to send and receive signals over the various networks.

The mobile device 104 may further include one or more loudspeakers 526 to output audio sounds represented by audio data. In some examples, the loudspeakers 526 may be used in conjunction with the microphones 520 to facilitate a conversation with a user 106. For instance, the mobile device 104 may stream audio data representing speech utterances of the user 106 to the remote system 102, and receive text-to-speech (TTS) response audio data to output using the loudspeakers 526 to facilitate a dialog with the user 106.

Further, the mobile device 104 may include one or more physical connection input/output ports for sending and receiving data, such as audio data. The physical connection ports may include an auxiliary port 528, and USB port 530, or any other type of ports to facilitate a wired connection. However, other types of physical connection ports may be included in mobile device 104. The mobile device 104 may further include one or more location sensors 532 to determine a location of the mobile device 104. The location sensor(s) 532 may comprise any type of location sensor, such as a Global Positioning System (GPS) sensor, a cellular-network-based location sensor, and so forth. The mobile device may utilize the location sensor(s) 532, periodically or continuously, to determine a location of the mobile device 104. In some examples, the mobile device 104 may send location data indicating the location of the mobile device 104 to the remote system 102 to be utilized as device-context data 402. For instance, the location of the mobile device 104 may be used to determine whether the mobile device 104 has crossed a predefined geo-fence associated with an event. For instance, the request-invocation component 118 may detect an event of the mobile device 104 moving past a geo-fence (e.g., user 106 is driving their car out of their garage on the way to work), and initiate an SR request based on this event, such as sending a flash briefing command to the mobile device 104.

Figure 6A:
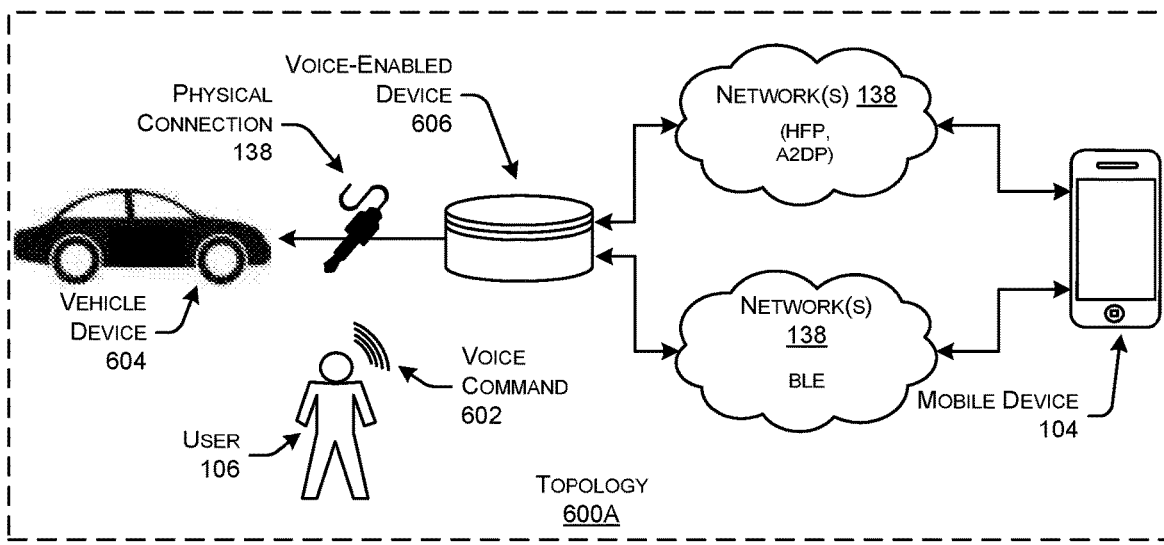
FIGS. 6A and 6B illustrate example topologies of a mobile device being communicatively connected to periphery devices in a vehicle environment.
Figure 6B:
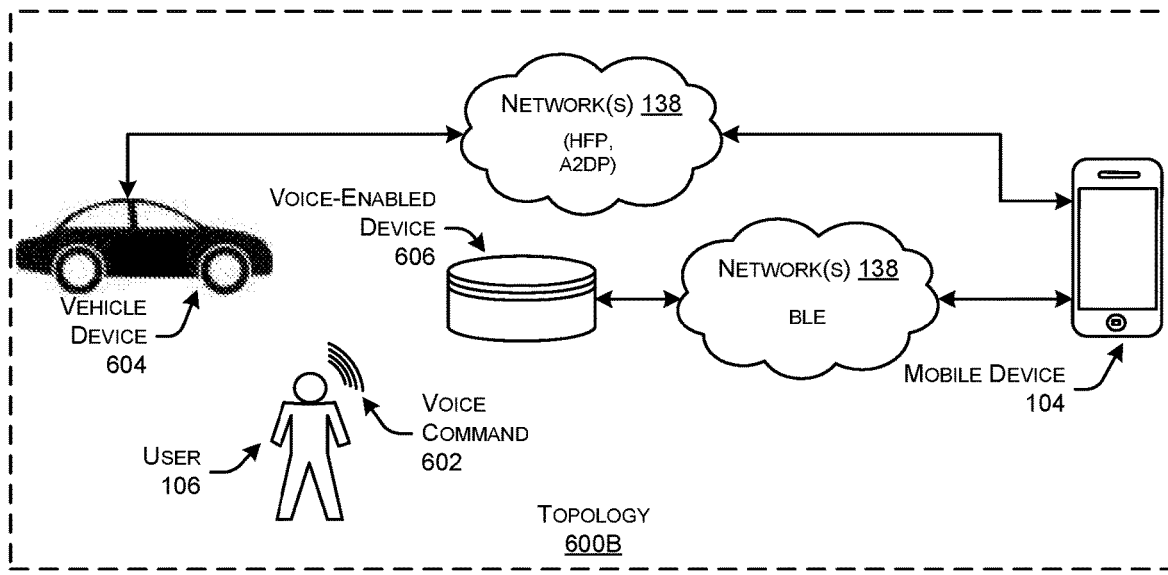

FIGS. 6A and 6B illustrate example topologies of a mobile device 104 being communicatively connected to periphery devices 136 in a vehicle environment.

FIG. 6A illustrates an example topology 600A where a user 106 issues a voice command 602 in an environment that includes a vehicle device 604 and a voice-enabled device 606. The voice-enabled device 606 (e.g., periphery device 136) may include at least one microphone to detect the voice command 602 (e.g., wake word detection) and generate audio data. The voice-enabled device 606 may send the audio data over a network, such as a network(s) 138 (e.g., A2DP, BLE, etc.) to the mobile device 104, which in turn transmits the audio data to the remote system 102. The mobile device 104 may receive a command to stream audio data, such as music. In topology 6A, the vehicle device 604 may be communicatively coupled to the voice-enabled device 606 via a physical connection 138, such as auxiliary. Thus, the mobile device 104 may send the audio data (e.g., A2DP for music, HFP for phone calls, etc.) to the voice-enabled device 606, which may output the audio data and/or send the audio data to the vehicle computing device 604 to be output by speakers of the vehicle computing device.

FIG. 6B illustrates another example topology 600B of a mobile device 104 being communicatively connected to periphery devices 136 in a vehicle environment. In this example, the voice-enabled device 606 may similarly detect a voice command 602 and generate audio data representing the voice command 602 to be sent over a network 138 to the mobile device 104. The mobile device 104 may communicate audio and/or video data directly to the vehicle device 604 using network(s) 138. Thus, the vehicle device 604 may output audio data that is streamed from the mobile device 104.

Topologies 600A and 600B may be examples of arrangements of periphery devices 136 according to aspects of this disclosure. The remote system 102 may send commands that were imitated based on events initiated and detected at the remote system 102. The mobile device 104 may send audio data to be output by at least one of the voice-enabled device 606 and/or the vehicle device 604.

Figure 7A:
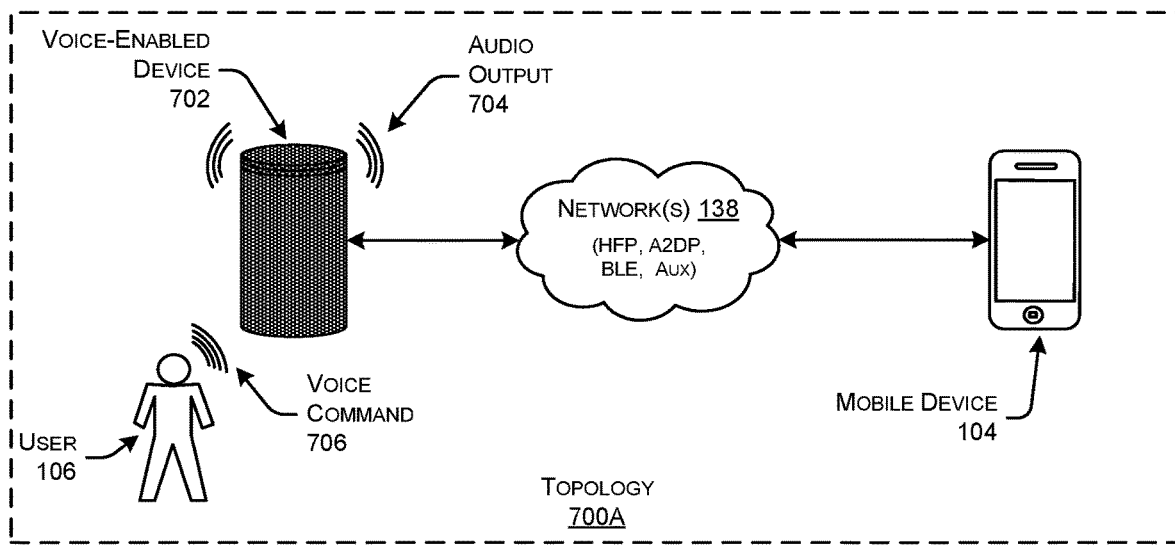
FIGS. 7A and 7B illustrate additional example topologies of a mobile device being communicatively connected to periphery devices.
Figure 7B:
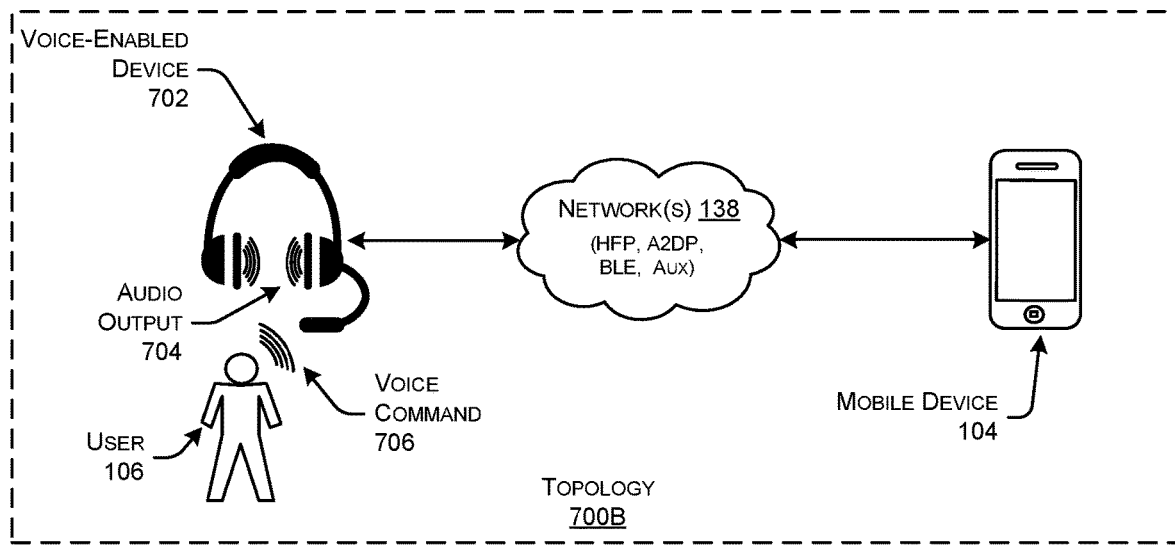

FIGS. 7A and 7B illustrate additional example topologies of a mobile device being communicatively connected to periphery devices.

FIG. 7A illustrates an example topology 700A where a mobile device 104 is communicatively connected to a voice-enabled device 702 (e.g., audio input/output device). The voice-enabled device 702 may perform various roles, such as behaving as a speaker and doing audio output 704 on behalf of the mobile device 104. Further, the voice-enabled device 702 may perform a role of a microphone on behalf of the mobile device 104 and detecting voice commands 706 and generating/sending audio data representing the voice command 706 to the mobile device 104, which may in turn transmit the audio data to the remote system 102.

FIG. 7B illustrates another example topology 700B where a mobile device 104 is communicatively connected to a voice-enabled device 702 (e.g., headset device). The voice-enabled device 702 may perform various roles, such as behaving as a speaker and doing audio output 704 on behalf of the mobile device 104. Further, the voice-enabled device 702 may perform a role of a microphone on behalf of the mobile device 104 and detecting voice commands 706 and generating/sending audio data representing the voice command 706 to the mobile device 104, which may in turn transmit the audio data to the remote system 102.

The topologies 600A, 600B, 700A, and 700B are merely illustrative, and any other topology may be utilized to implement the techniques described herein.

Figure 8:
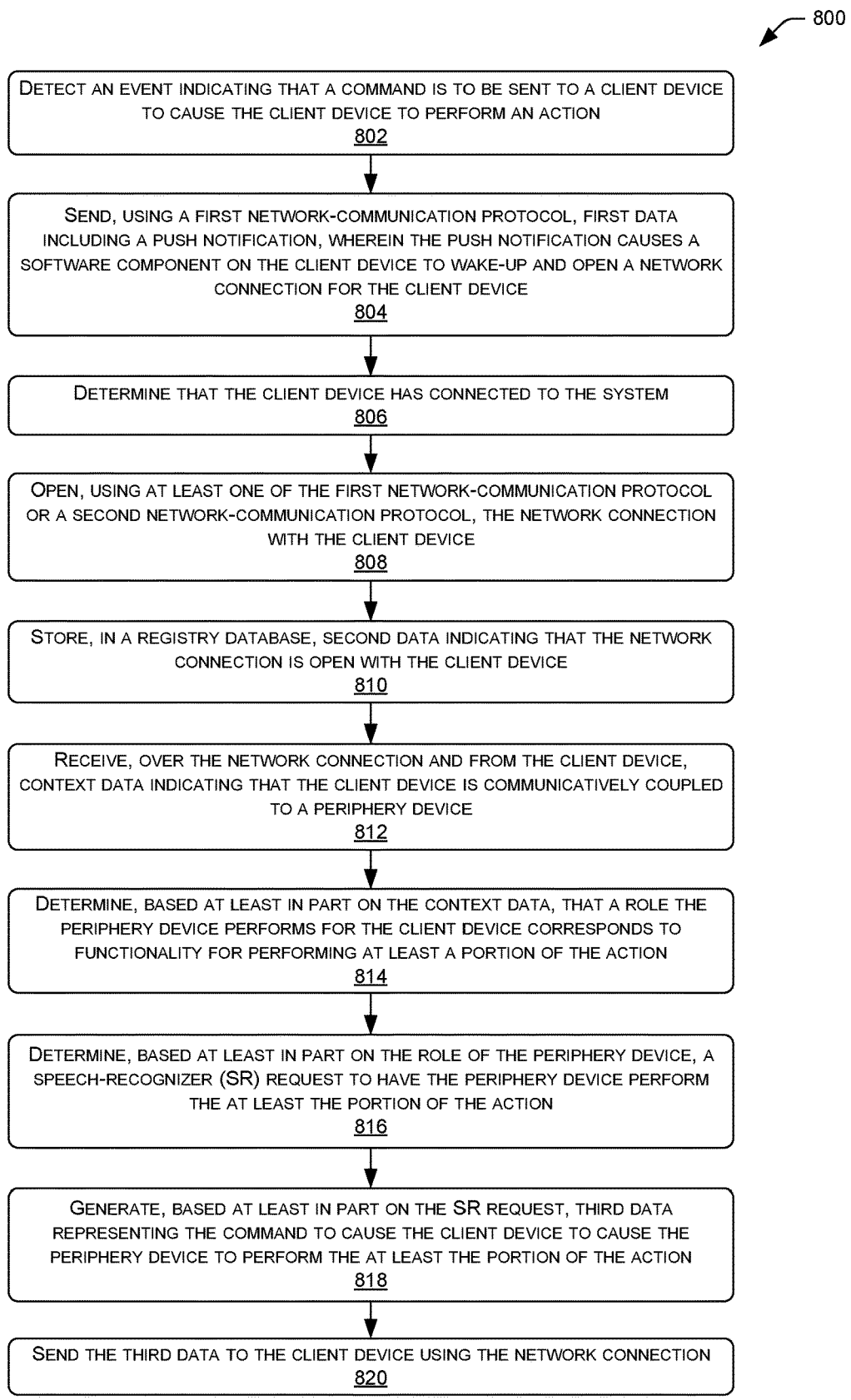
FIG. 8 illustrates a flow diagram of an example method for a remote system to initiate a command for a mobile device, send a push notification to prompt the mobile device to establish a network connection with the remote system, and send the command to the mobile device using the network connection.
Figure 9:
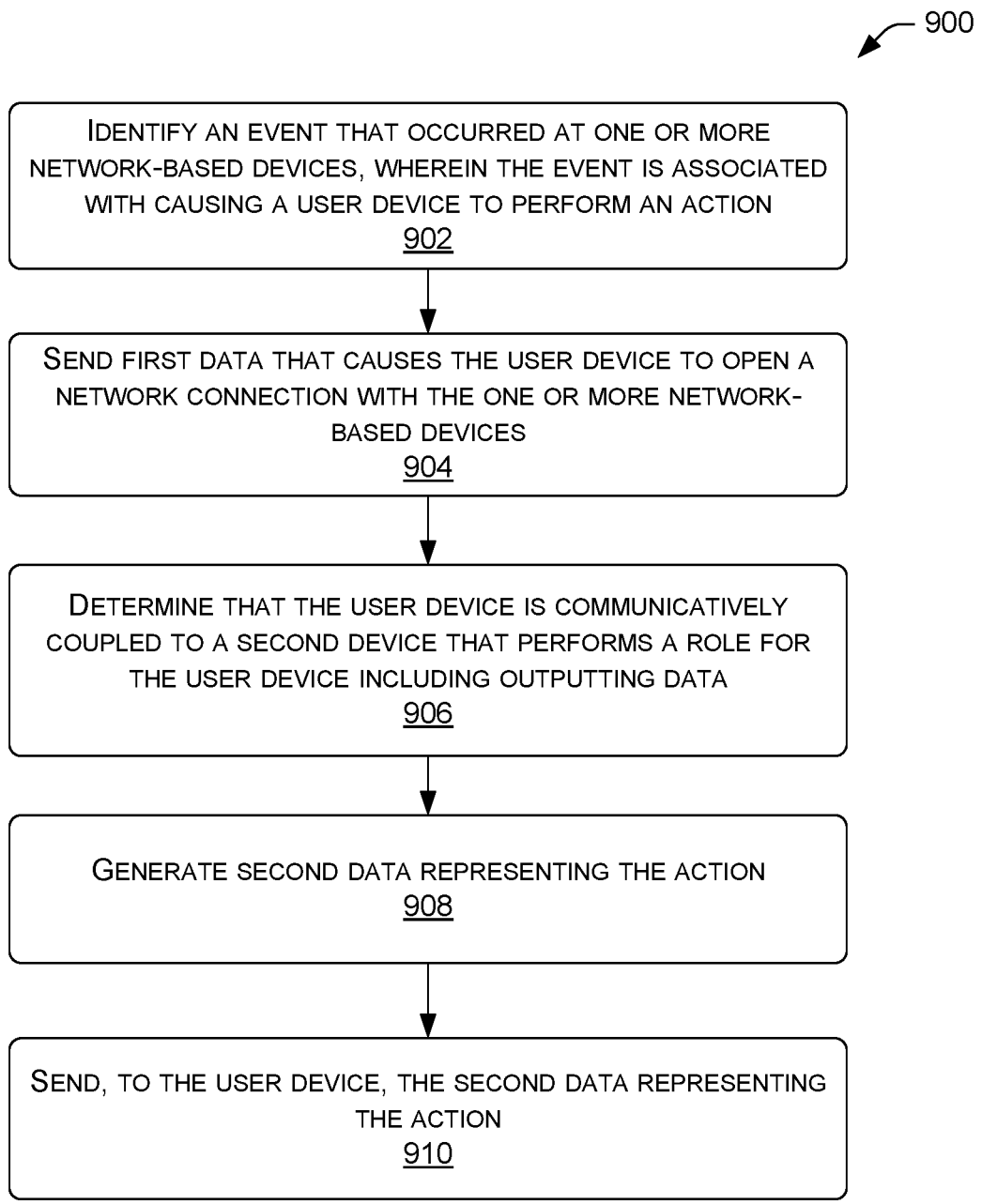
FIG. 9 illustrates a flow diagram of another example method for a remote system to initiate a command for a mobile device, send a push notification to prompt the mobile device to establish a network connection with the remote system, and send the command to the mobile device using the network connection.

FIGS. 8 and 9 illustrate flow diagrams of example methods 800 and 900 for a system to initiate a command for a mobile device, send a push notification to prompt the mobile device to establish a network connection with the remote system, and send the command to the mobile device using the network connection. These methods are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 8 illustrates a flow diagram of an example method 800 for a remote system to initiate a command for a mobile device, send a push notification to prompt the mobile device (e.g., client device) to establish a network connection with the remote system, and send the command to the mobile device using the network connection.

At 802, a system (e.g., remote system 102) may detect an event indicating that a command is to be sent to a client device 104 to cause the client device to perform an action. For instance, the request-invocation component 118 may detect an event occurring at the remote system 102.

In some examples, the remote system 102 may determine, at least partly by polling a registry database(s) 128 of the system 102, that the client device 104 does not have an open network connection with the system 102. For instance, the registry database(s) 128 may include device-context data 402 that indicates that a network-connection status of the client device 104 is "closed".

At 804, the remote system 102 may send, via the network interface 112 and using a first network-communication protocol, first data including a push notification (e.g., push-notification message 300). In some examples, the push notification may cause/prompt a software component (e.g., communications application 512) on the client device 104 to wake-up and open a network connection between the client device 104 and the network interface 112.

In some examples, the first data including the push notification may be sent using the first network-communication protocol comprises at least one of a PushKit push notification message, Voice over Internet Protocol (VoIP) push notification message to prompt the software component to wake-up and open the network connection, a Firebase push notification message, a Google Cloud Messaging (GCM) push notification message to prompt the software component to wake-up and open the network connection, or an Apple Push Notification service (APNs) push notification to prompt the software component to wake-up and open the network connection.

At 806, the remote system 102 may determine that the client device has 104 has connected to the remote system 102.

At 808, the remote system 102 may open, via the network interface 112 and using at least one of the first network-communication protocol or a second network-communication protocol, the network connection with the client device 104. In some examples, the second network-communication protocol by which the network communication connection is opened comprises at least one of a Hypertext Transfer Protocol (HTTP) or a Hypertext Transfer Protocol-2 (HTTP-2).

At 810, the remote system may store, in a registry database(s) 128, second data (e.g., device-context data 402) indicating that the network connection is open with the client device 104. At 812, the remote system 810 may receive, over the network connection and from the client device 104, context data indicating that the client device is communicatively coupled to a periphery device 136. For instance, the remote system 102 may receive a response device-context message 302 from the client device 104.

At 814, the remote system 102 may determine, based at least in part on the context data, that a role the periphery device performs for the client device corresponds to functionality for performing at least a portion of the action. For instance, the role may indicate that the periphery device is able to output audio data, display video data, receive audio data, and/or perform any other type of function that may be performed by a periphery device (e.g., appliances, vehicle, etc.).

At 816, the remote system 102 (e.g., request-invocation component 118) may determine/generate a speech-recognizer (SR) request to have the periphery device perform the at least the portion of the action. For instance, the action may include causing the user client device to stream music data from a content source, and in turn communicate the audio music/audio data to the periphery device to be output by a loudspeaker of the periphery device. In some examples, the SR request may be in a same format as that of requests that are generated responsive to speech commands of a user 106 of the client device 104.

At 818, the remote system 102 may generate, based at least in part on the SR request, third data representing the command to cause the client device 104 to perform the action. In some examples, performance of the action by the client device 104 includes causing the periphery device 136 to output audio data. At 820, the remote system may send the third data to the client device 104 using the network connection.

In some examples, the context data comprises a first context data, and the first data further includes a first request that the client device provide the first context data indicating that the client device is communicatively coupled to the periphery device, and a second request that the client device provide second context data indicating of a role of the periphery device. In such examples, the method 800 may further comprise receiving, from the client device, the second context data indicating that the role of the periphery device is to act as a speaker on behalf of the client device, storing the first context data indicating that the periphery device is communicatively coupled to the client device, and storing the second context data indicating that the role of the periphery device is to act as a speaker on behalf of the client device. In such examples, generating the third data including the command is performed at least partly based on the role of the periphery device acting as the speaker of the client device.

FIG. 9 illustrates a flow diagram of another example method 900 for a remote system to initiate a command for a mobile device, send a push notification to prompt the mobile device to establish a network connection with the remote system, and send the command to the mobile device using the network connection. In some examples, the one or more network-based devices may correspond to the remote system 102 described herein. Further, the user device of method 900 may correspond to the mobile device 104 described herein.

At 902, one or more network-based devices may identify an event that occurred at one or more network-based devices. In some examples, the event is associated with causing a user device 104 to perform an action (e.g., flash briefing, stream music data, etc.). In some examples, identifying the even comprises at least one of detecting, at the one or more network-based devices, a scheduled appointment for the user device at which the user device is to perform the action, detecting, at the one or more network-based devices, an end of a timer that was previously set by the user device, or determining, at the one or more network-based devices, that the user device had previously been streaming audio data prior to losing network connectivity.

In some examples, the one or more network-based devices may determine that a network connection is not opened between the user device and the one or more network-based devices. For instance, a push-notification component 124 may poll a registry database(s) 128 to identify a status of the user device 104 as "closed".

At 904, the one or more network-based devices may send first data (which may include a push notification) that causes the user device to open the network connection with the one or more network-based devices. For example, the push-notification component 124 may send a push-notification message 300 to the user device 104.

In some examples, the first data may further include a request that the user device 104 provide an indication that the user device 104 is communicatively coupled to the periphery device 136. The method 900 may further comprise, subsequent to sending the first data receiving, from the user device 104, third data indicating that the user device 104 is communicatively connected to the periphery device 136, and storing, at the one or more network-based devices, context data 402 indicating that the user device 104 is communicatively coupled to the periphery device 136.

At 906, the one or more network-based devices may determine that the user device 104 is communicatively coupled to a periphery device 136. For instance, the push-notification component 124 may poll the registry database(s) 128 to identify the status of the user device 104 as "open".

At 908, the one or more network-based devices may generate second data representing the action. In some examples, the second data representing the action includes an instruction for the user device to cause the periphery device to output audio data. At 910, the one or more network-based devices may send, over the network connection to the user device 104, the second data representing the action.

In some examples, method 900 may further include receiving, from the user device 104, third data indicating that the periphery device is communicatively coupled to the user device, and storing, at the one or more network-based devices, context data indicating that the periphery device is communicatively coupled to the user device. In such examples, determining that the user device is communicatively coupled to the periphery device may be based at least in part on the context data that is stored at the one or more network-based devices.

In further examples, the method 900 may comprise, prior to determining the event, receiving, from the user device 104, third data indicating that a role of the periphery device 136 is to act as a speaker on behalf of the user device 104, and storing, at the one or more network-based devices, context data indicating the role of the periphery device 136. In such examples, generating the second data representing the action is performed based at least in part on the role of the periphery device being to act as a speaker on behalf of the user device.

The method 900 further comprises receiving, from the user device 104, a request to register the user device 104 with an account associated with the one or more network-based devices. Subsequent to receiving the request to register the user device, the method 900 may include providing the user device 104 with a private key for asymmetrical cryptography, storing, at the one or more network-based devices, a public key that corresponds to the private key, and encrypting, using the public key, the second data representing the action to generate encrypted data. Alternately, the public key could encrypt the symmetric key, and the symmetric key could be used to encrypt the payload. In such examples, sending the second data representing the action to the user device 104 comprises sending the encrypted data to the user device 104.

As used herein, a processor, such as processor(s) 108 and/or 502, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 502 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 502 may possess its own local memory, which also may store program components, program data, and/or one or more operating systems.

As described herein, computer-readable media 110 and/or 504 may include volatile and nonvolatile memory, removable and non-removable media implemented in any method or technology for storage of information, such as computer-readable instructions, data structures, program component, or other data. Such computer-readable media 110 and/or 504 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 108 and/or 502 to execute instructions stored on the computer-readable media 110 and/or 504. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 110 and/or 504, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; Android from Google; iOS and MacOSX from Apple; and so forth.

Each of the network interface(s) 112 and network interface(s) 522 may enable communications between the voice-enabled devices 108 and the remote system 110, as well as other networked devices. Such network interface(s) 522 can include one or more network interface controllers (NICs) or other types of transceiver devices to send and receive communications over a network. For instance, the network interface(s) 522 may include a Bluetooth radio, and/or any other type of radio.

For instance, each of the net network interface(s) 112 and network interface(s) 522 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 112 and network interface(s) 522 may include a wide area network (WAN) component to enable communication over a wide area network. The network(s) 114 and/or 138 may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    identifying an event that occurred at one or more network-based devices, wherein the event is associated with causing a first device to perform an action;
    based at least in part on identifying the event, sending, from the one or more network-based devices, first data that causes the first device to open a network connection with the one or more network-based devices;
    determining that the first device does not include a speaker;
    determining, at the one or more network-based devices, that the first device is communicatively coupled to a second device that performs a role for the first device;
    receiving, from the first device, an indication that the second device is to act as an audio output component for the first device;
    generating, at the one or more network-based devices and based at least in part on the second device acting as the audio output component for the first device, second data representing the action, wherein the second data representing the action causes the first device to cause the second device to output audio via the audio output component of the second device; and
    sending, from the one or more network-based devices and to the first device, the second data representing the action.

2. The method of claim 1, further comprising:
    receiving, from the first device, third data indicating that the second device is communicatively coupled to the first device; and
    storing context data indicating that the second device is communicatively coupled to the first device, wherein determining that the first device is communicatively coupled to the second device is based at least in part on the context data.

3. The method of claim 1, wherein the first data further includes a request that the first device provide an indication that the first device is communicatively coupled to the second device, and the method further comprising, subsequent to sending the first data:
receiving, from the first device, third data indicating that the first device is communicatively connected to the second device; and
storing context data indicating that the first device is communicatively coupled to the second device.

4. The method of claim 1, further comprising:
generating a speech-recognizer request that corresponds to the event that occurred at the one or more network-based devices, wherein the speech-recognizer request is in a same format as requests that are generated responsive to voice commands of a user received from the first device,
wherein generating the second data representing the action is performed based at least in part on the speech-recognizer request.

5. The method of claim 1, further comprising:
identifying a second event that occurred at the one or more network-based devices, the second event being associated with causing the first device to perform a second action;
determining that the first device is not communicatively coupled to the second device or a third device; and
refraining from sending third data representing the second action to the first device.

6. The method of claim 1, wherein identifying the event comprises at least one of:
detecting a scheduled appointment for the first device at which the first device is to perform the action;
detecting an end of a timer that was previously set by the first device; or
determining that the first device had previously been streaming audio data prior to losing network connectivity.

7. The method of claim 1, wherein the first data further includes:
an indication of a software component installed on the first device that is configured to open the network connection with the one or more network-based devices; and
third data that causes the software component to open the network connection.

8. The method of claim 1, wherein:
the second device is configured to output images; and
the second data representing the action causes the first device to cause the second device to output the images.

9. A system comprising:
one or more processors;
a network interface; and
computer-readable media storing computer-executable instructions that, when executed by the one or more processors, cause the one or more processors to perform operations comprising:
identifying an event that occurred at the system, wherein the event indicates a first device is to perform an action that includes causing audio to be output;
sending, using the network interface and to the first device, first data that causes the first device to open a network connection with the network interface;
identifying context data indicating that the first device is communicatively coupled to a second device that performs a role for the first device;
determining that the first device does not include a speaker;
receiving, from the first device, an indication that the second device is to act as an audio output component for the first device;
generating, based at least in part on the second device acting as the audio output component for the first device, second data representing the action, wherein the second data causes the first device to cause the second device to output audio via the audio output component of the second device; and
sending the second data to the first device using the network connection.

10. The system of claim 9, wherein the context data comprises first context data, the operations further comprising, subsequent to sending the second data to the first device:
receiving, from the first device, third data indicating that the first device is not communicatively connected to the second device; and
storing second context data indicating that the first device is not communicatively coupled to the second device.

11. The system of claim 9, the operations further comprising:
generating a speech-recognizer request that corresponds to the event that occurred at the system, wherein the speech-recognizer request is in a same format as requests that are generated responsive to processing audio data representing voice commands of a user received from the first device,
wherein generating the second data representing the action is based at least in part on the speech-recognizer request.

12. The system of claim 9, wherein:
the second device is configured to output images for the first device; and
the second data representing the action causes the first device to cause the second device to output the images.

13. The system of claim 9, wherein:
the first data further includes a request that the first device provide an indication that the second device is communicatively coupled to the first device; and
the operations further comprising receiving, from the first device, third data indicating that the second device is communicatively coupled to the first device.

14. A system comprising:
one or more processors;
a network interface; and
computer-readable media storing computer-executable instructions that, when executed by the one or more processors, cause the one or more processors to perform operations comprising:
identifying an event that occurred at the system, wherein the event is associated with causing a first device to perform an action;
sending first data that causes the first device to open a network connection with the network interface;
determining that the first device is communicatively coupled to a second device that performs a role for the first device;
determining that the first device does not include a speaker;
receiving, from the first device, an indication that the second device is to act as an audio output component for the first device;

generating, based at least in part on receiving the indication, second data representing the action, wherein the second data representing the action causes the first device to cause the second device to output audio by the audio output component of the second device; and sending, to the first device, the second data representing the action.

15. The system of claim 14, the operations further comprising:

receiving, from the first device, third data indicating that the second device is communicatively coupled to the first device; and storing context data indicating that the second device is communicatively coupled to the first device, wherein determining that the first device is communicatively coupled to the second device is based at least in part on the context data.

16. The system of claim 14, the operations further comprising:

identifying a second event that occurred at the system, the second event being associated with causing the first device to perform a second action;

determining that the first device is not communicatively coupled to the second device or a third device; and refraining from sending third data representing the second action to the first device.

* * * * *